United States Patent
Mattes et al.

(10) Patent No.: US 7,258,190 B2
(45) Date of Patent: Aug. 21, 2007

(54) OCCUPANT WARNING DEVICE IN A VEHICLE

(75) Inventors: Bernhard Mattes, Sachsenheim (DE); Hans Goslowsky, München (DE)

(73) Assignee: Robert Bosch GmbH, Stuttgart (DE)

( * ) Notice: Subject to any disclaimer, the term of this patent is extended or adjusted under 35 U.S.C. 154(b) by 390 days.

(21) Appl. No.: 10/473,731

(22) PCT Filed: Dec. 15, 2001

(86) PCT No.: PCT/DE01/04749

§ 371 (c)(1),
(2), (4) Date: Mar. 22, 2004

(87) PCT Pub. No.: WO02/079005

PCT Pub. Date: Oct. 10, 2002

(65) Prior Publication Data

US 2004/0145456 A1  Jul. 29, 2004

(30) Foreign Application Priority Data

Mar. 31, 2001 (DE) ................. 101 16 190

(51) Int. Cl.
*B60K 28/00* (2006.01)

(52) U.S. Cl. ...................................................... 180/273
(58) Field of Classification Search ................ 180/271, 180/273; 280/735
See application file for complete search history.

(56) References Cited

FOREIGN PATENT DOCUMENTS

| DE | 43 41 500 | 6/1994 |
|----|-----------|--------|
| DE | 44 06 897 | 5/1995 |
| DE | 198 56 311 | 6/2000 |
| DE | 199 00 395 | 6/2000 |
| EP | 0 473 324 | 3/1992 |
| WO | 01 08930 | 2/2001 |

*Primary Examiner*—Faye M. Fleming
(74) *Attorney, Agent, or Firm*—Kenyon & Kenyon LLP

(57) ABSTRACT

A device for warning occupants in a vehicle is proposed which is connectible to a passenger-compartment sensory system and which has a warning device for an occupant, the warning device being activated as a function of signals from the passenger-compartment sensory system. As a warning device, a display, and/or a loudspeaker, and/or haptic means can be used. The vehicle occupant is warned, in particular, if he/she is in the so-called out-of-position situation. In the process, it is checked whether the occupant has been in the out-of-position situation, without interruption, for a predefined time period. Only then does a warning also follow.

3 Claims, 2 Drawing Sheets

OCCUPANT WARNING DEVICE IN A VEHICLE

FIELD OF THE INVENTION

The present invention is directed to a device for warning occupants in a vehicle.

BACKGROUND INFORMATION

To detect the position of a vehicle occupant, it is known to use a passenger-compartment sensory system. There are intelligent and passive passenger-compartment sensory concepts which are conceived as sensor systems. These include ultrasonic sensors, active infrared sensors, passenger-compartment cameras, in particular stereo-video or stereo-CCD cameras, radar sensors, and, in this context, in particular SAR radar concepts (synthetic aperture radar), absolute-weight sensors, for example those based on wire strain gauges, occupant-classification sensors, for example seat-mat, seat-position, headrest-position, seat-back-inclination, seat-belt-usage, seat-belt-load, child-seat-occupancy detection sensors or also combinations of such sensor concepts. This information is then used for triggering occupant-restraint systems.

German Published Patent Application No. 198 56 311 describes the output of an acoustic and/or and optical warning as a function of the sitting position of a vehicle occupant. In this context, the out-of-position position is monitored in particular. In German Published Patent Application No. 199 00 395, besides outputting a warning in response to an out-of-position position, the airbag is also disabled.

SUMMARY OF THE INVENTION

By contrast, the device for warning vehicle occupants according to the present invention has the advantage over the related art that a vehicle occupant is warned if he/she is in a position where he/she is at risk of injury. These are, in particular, so-called out-of-position situations. These out-of-position (OOP) situations indicate that an occupant is situated too close to an airbag or in an unfavorable position in relation to the airbag, and that, in the event that the airbag is triggered, this person would possibly be injured or would not be optimally protected. The present invention now makes it possible for an occupant to be warned, so that a vehicle manufacturer is able to provide the occupant with the opportunity to assume a position that offers him/her optimal protection, even in the event of an accident.

It is particularly advantageous that the warning device has a display, and/or a loudspeaker, and/or haptic means for outputting the warning. Thus, in dangerous situations, different channels are used to output warnings to an occupant. For example, if an occupant is sleeping, he/she is not able to perceive an optical warning. For that reason, it is beneficial to have an acoustic and/or a haptic warning. Thus, in accordance with the present invention, combinations of these various warning means are also possible. Moreover, a warning is provided for each vehicle occupant. The haptic warning may be implemented, in particular, in the form of seat or steering-wheel vibrations and, as the case may be, as seat-cushion surface movements.

Beyond that, it is advantageous that the warning device does not output a warning until an occupant is situated for a predefined period of time in the out-of-position position. This ensures that an inadvertent, brief movement of the person into the out-of-position situation does not cause a warning to be output. This prevents occupants from being unnecessarily disturbed by needless warnings, which would result in their possibly ignoring future warnings.

Finally, it is also beneficial that a processor is provided to which the passenger-compartment sensory system is connected. It evaluates the signals from the passenger-compartment sensory system and activates the warning device as a function of the evaluation.

DETAILED DESCRIPTION

In the United States in particular, but in other countries as well, it is the aim of legislation to avoid injuries or even fatalities through the use of restraining devices, such as airbags. Such injuries occur, in particular, when a vehicle occupant is situated in a so-called out-of-position (OOP) position. In such situations, the vehicle occupant is too close to the airbag, because in the event that the airbag is triggered, the risk of injury to the vehicle occupant is very high. In accordance with the present invention, a warning device indicates to the vehicle occupant when he/she is situated in an out-of-position position. One may also expand upon this to the effect that other positions as well, which also increase the probability of an injury, for example because the sitting position does not enable an optimal protection by an airbag in the event of an accident, lead to a warning.

Figure 1:
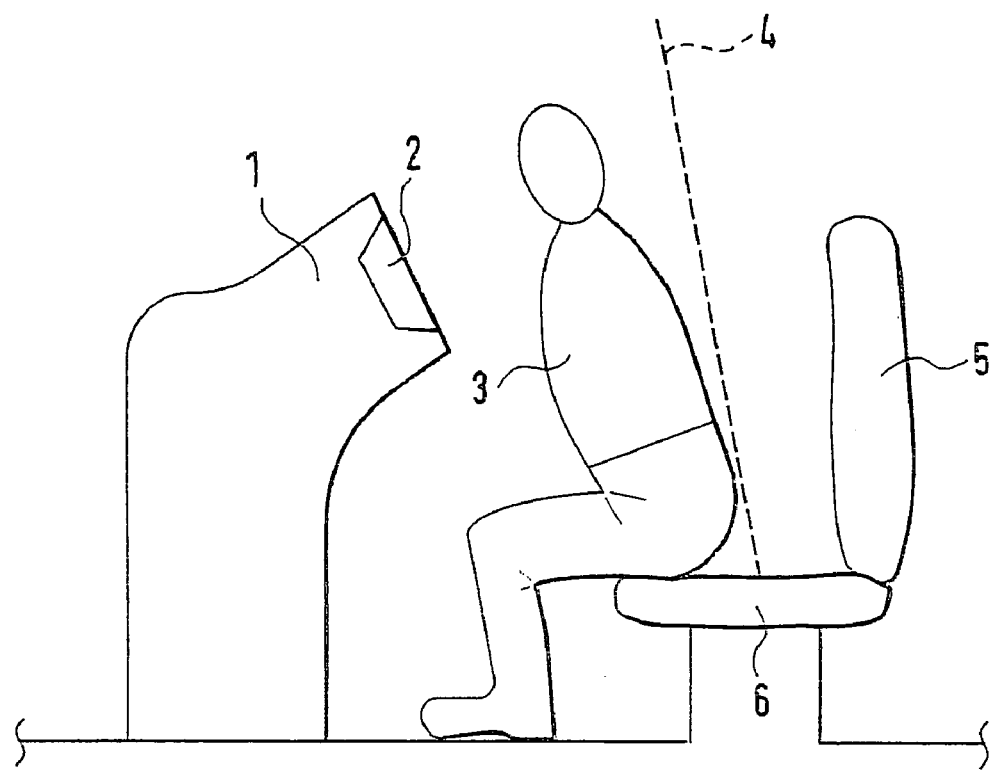
FIG. 1 shows an out-of-position situation.

FIG. 1 schematically depicts a vehicle occupant who is situated in an OOP. A dashboard 1 has an airbag 2, which is provided for protecting a vehicle occupant 3. Vehicle occupant 3 is seated on a vehicle seat 6 having a seat back 5. At this point, vehicle occupant 3 is seated so far to the front that he/she is situated in the so-called out-of-position position. This zone is reached when the upper body is situated to the left of the dotted-line boundary 4. Person 3 is now too close to airbag 2, so that, should airbag 2 be triggered, there is the danger of being hit by the airbag with an impact that could cause injury.

Figure 2:
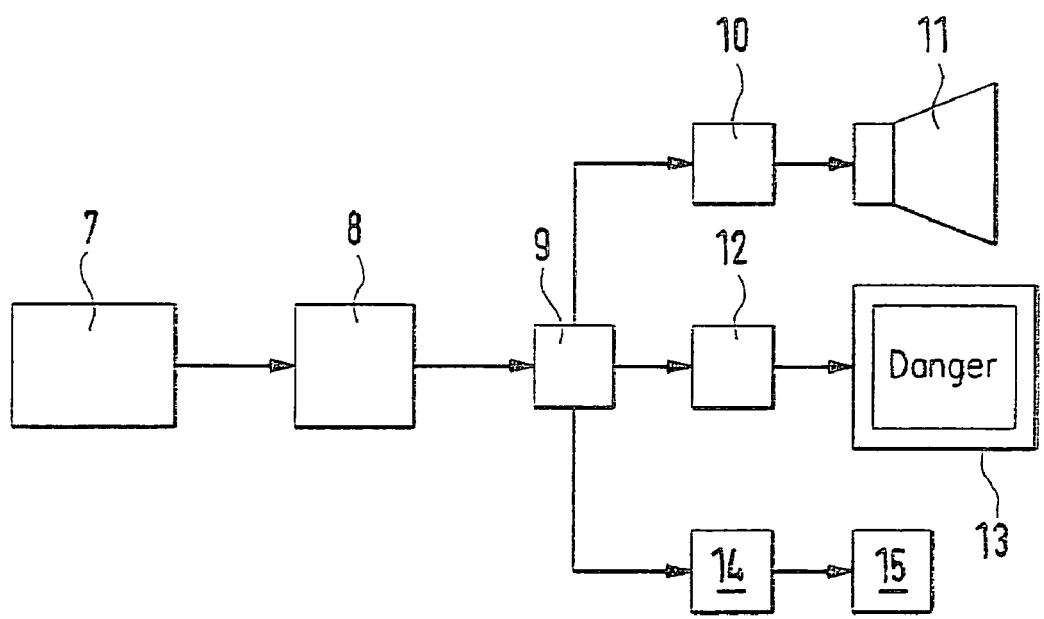
FIG. 2 shows a block diagram of the device according to the present invention.

FIG. 2 shows a block diagram of the device according to the present invention. A passenger-compartment sensory system 7 is connected to a data input of a processor 8. A data output of processor 8 leads to a signal processing 9 of a warning device. A first data output of signal processing 9 leads to an audio amplifier 10 which is connected to a loudspeaker 11. A second data output of signal processing 9 leads to a drive circuit 12 which controls a display 13. A third data output of signal processing 9 leads to a drive circuit 14 which controls a steering-wheel vibration 15. Alternatively, it is possible that only one or two of the three warning devices shown here, loudspeaker, display and steering-wheel vibration, are used. Moreover, it is possible that a seat vibration is able to be activated by drive circuit 14.

Compartment sensory system 7 detects the sitting position of the vehicle occupant. In this context, it is also detected whether or not a vehicle occupant is at all situated on the seat being monitored. As a passenger-compartment sensory system, it is possible to use ultrasonic sensors, active infrared sensors, passenger-compartment cameras, radar sensors, absolute-weight sensors, seat-mat sensors, seat-position sensors, headrest-position sensors, seat-back inclination sensors, seat-belt-usage sensors, seat-belt-load sensors, child-seat-occupancy detection sensors and combinations thereof. The signals from these passenger-compartment sensory-system concepts control the activation of the restraining means in the event of a crash, thereby adapting the same to the particular situation. At this point, the passenger-compartment sensory system transmits the sitting position to processor 8. Processor 8 evaluates whether the sitting position of the vehicle occupant ascertained by passenger-compartment sensory system 7 indicates that the vehicle occupant is situated in a position where he/she is at risk of injury. This is recognized by processor 8 in that it compares the ascertained sitting position of the vehicle occupant to predefined boundary 4. If, at this point, the upper body of vehicle occupant 3 is situated between boundary 4 and dashboard 1, then an out-of-position situation exists. If processor 8 recognizes such a position, then a warning to vehicle occupant 3 is necessary. Processor 8 then transmits an activation to this effect to signal processing 8 in order to trigger a warning to the vehicle occupant.

Then, via audio amplifier 10, loudspeaker 11, drive circuit 12, display 13, and drive circuit 14, signal processing 9 activates steering-wheel vibration 15. In the process, predefined warnings are output via loudspeaker 11. A predefined text is also shown on display 13, as indicated here by the English word "danger". On the other hand, steering-wheel vibration 15 generates a vibration signal. Steering-wheel vibration 15 is, of course, only suited for a driver. For a passenger, a vehicle-seat surface vibration is then the appropriate means. It may also be provided, however, that the driver is warned via steering-wheel vibration 15 that at least one of his/her passengers is situated in a sitting position where there is the danger of injury.

Via display 13, it may also be indicated on which seat the person is situated who is in a dangerous position. Finally, via loudspeaker 15, it is possible to announce the particular vehicle seat where the vehicle occupant is situated who has assumed a position where he/she is at risk of injury.

It is possible for one vehicle to have plurality of indicators, ideally for each passenger.

Figure 3:
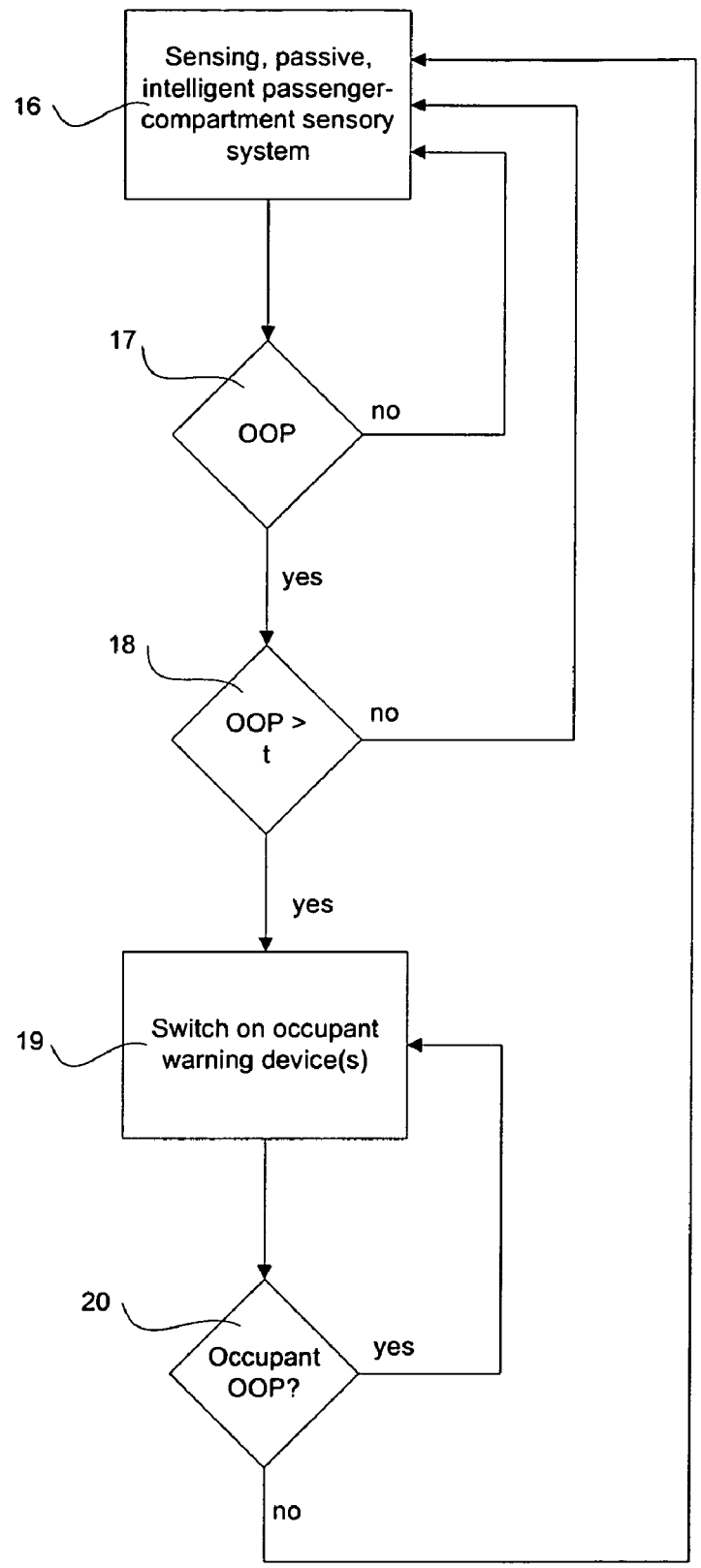
FIG. 3 shows a flow chart of the method according to the present invention.

In FIG. 3, a method according to the present invention is represented as a flow chart. In method step 16, passenger-compartment sensory system 7 recognizes the position in which occupant 3 is situated. In method step 17, it is checked whether the vehicle occupant is situated in the OOP. If this is not the case, then the system branches back to method step 16. However, if it was ascertained that vehicle occupant 3 is situated in the OOP, then it is checked in method step 18 whether the vehicle occupant is situated for longer than a predefined time period in this OOP. If this is not the case, then the system branches back to method step 16. However, if this is the case, then the system branches back to method stop 19, and warning devices 11, 13 and 15 are activated. It is subsequently checked and, in fact, by passenger-compartment sensory system 7 whether the vehicle occupant is still situated in the OOP (method step 20). If this is the case, warning devices 11, 13, and 15 are activated again in method step 19. If this is not the case, then the system branches back to method step 16. This flow chart is implemented on processor 8.

As described above, it is also possible that other sitting positions, where the occupant is at risk of injury, lead to the outputting of a warning.

What is claimed is:

1. A device for warning an occupant in a vehicle having a plurality of seats, the device being connectible to a passenger-compartment sensory system, comprising:
   a warning device for the occupant, wherein:
      the warning device outputs a warning as a function of a signal from the passenger-compartment sensory system,
      the warning device outputs the warning as a function of a detection of an out-of-position (OOP) situation of the occupant by the passenger-compartment sensory system, wherein the warning device indicates which one of the plurality of seats is occupied by the occupant experiencing the out-of-position situation, and
      the warning device outputs the warning if the OOP of the occupant persists without interruption for a predefined period of time.

2. The device as recited in claim 1, wherein:
   the warning device includes at least one of a display, a loudspeaker, and a haptic unit for outputting the warning.

3. The device as recited in claim 1, wherein:
   the device includes a processor that performs an evaluation of the signal from the passenger-compartment sensory system and that activates the warning device as a function of the evaluation.

* * * * *